United States Patent [19]

Smith et al.

[11] Patent Number: 4,481,830
[45] Date of Patent: Nov. 13, 1984

[54] APPARATUS FOR MEASURING FLUID FLOW

[75] Inventors: Jack E. Smith, Knoxville; David G. Thomas, Oak Ridge, both of Tenn.

[73] Assignee: The United States of America as represented by the United States Department of Energy, Washington, D.C.

[21] Appl. No.: 455,612

[22] Filed: Jan. 4, 1983

[51] Int. Cl.³ .......................... G01F 1/05; G01L 9/04; G21C 17/02
[52] U.S. Cl. .............................. 73/861.71; 73/861.73
[58] Field of Search ........... 73/861.71, 861.72, 861.73, 73/861.74; 376/246

[56] References Cited

U.S. PATENT DOCUMENTS 3,424,001 1/1969 Young .............................. 73/861.71
3,935,737 2/1976 Molitor ............................ 73/861.71

FOREIGN PATENT DOCUMENTS 2485724 12/1981 France ............................. 73/861.71

Primary Examiner—Gerald Goldberg
Assistant Examiner—Anna Schrichte
Attorney, Agent, or Firm—Edwin D. Grant; Stephen D. Hamel; Michael F. Esposito

[57] ABSTRACT

Flow measuring apparatus includes a support loop having strain gages mounted thereon and a drag means which is attached to one end of the support loop and which bends the sides of the support loop and induces strains in the strain gages when a flow stream impacts thereon.

6 Claims, 3 Drawing Figures

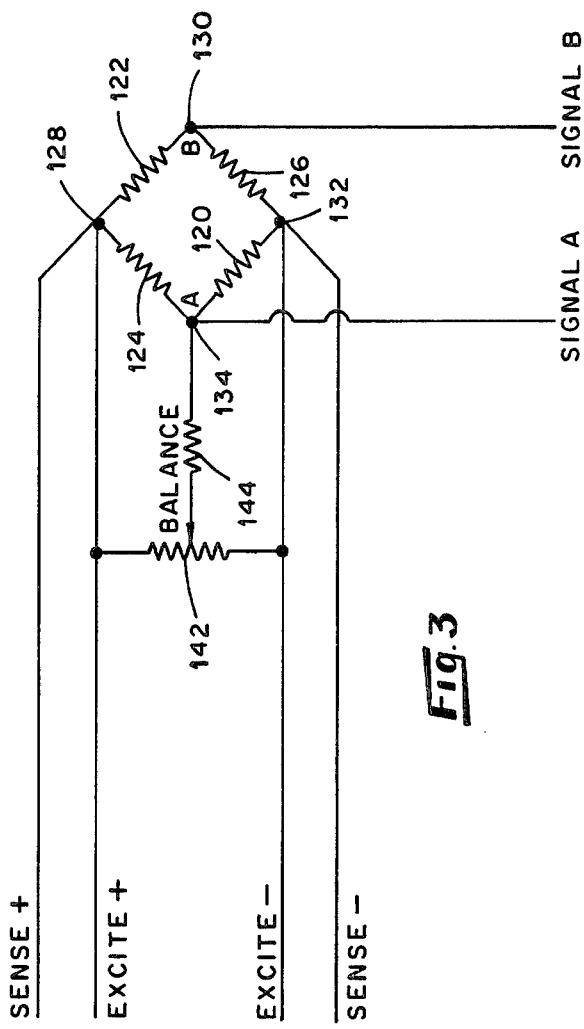

APPARATUS FOR MEASURING FLUID FLOW

BACKGROUND OF THE INVENTION

This invention, which resulted from a contract with the United States Department of Energy, relates to an apparatus for measuring momentum flux for determination of mass flow in two-phase fluids.

To safely control the operation of a nuclear reactor, the flow of coolant through the core of the reactor must be continuously monitored with precision. Under certain abnormal operating conditions, gas bubbles may be formed in the coolant, producing a two-phase fluid, the flow of which cannot be accurately measured by commonly used devices such as pitot tubes.

A flow metering system has been available heretofore which utilizes a drag body mounted on a flexible rod and strain gages mounted on the rod for generating an electric signal proportional to the force exerted by a stream on the drag body. In this known apparatus, the strain gages are located outside the measured stream, which introduces errors in flow readings because of uncompensated temperature differentials. Furthermore, the described arrangement of a drag body mounted on a rod is not suitable for measuring coolant flow in the core of a large nuclear reactor, since an excessively long support rod would be required for such use. Furthermore, insertion of such a device would perturb the flow, thus altering the flow phenomena that the device was intended to measure.

SUMMARY OF THE INVENTION

It is therefore an object of this invention to provide an apparatus capable of precisely measuring the flow rate of coolant in the core of a nuclear reactor.

Another object of the invention is to provide an improved flow metering system of the type which utilizes strain gages to detect movement of a drag body located in a stream.

These objects are achieved by a preferred embodiment of the invention comprising: an obround support loop disposed in a stream having a variable flow rate, the central axis of said support loop being transverse to the longitudinal axis of said stream, the sides of said support loop consisting of bendable strips which, when unflexed, are flat and substantially parallel with said longitudinal axis, one end of said support loop being fixed in position, the other end of said support loop being movable relative to said fixed end by bowing of said sides; a first pair of strain gages respectively attached to the outer surfaces of the sides of said support loop and a second pair of strain gages respectively attached to the inner surfaces of said sides, the directional axes of said strain gages being substantially parallel with the longitudinal axis of said stream when said sides are unflexed; and drag means mounted on the unfixed end of said support loop, the sides of said support loop being bowed and the lengths of said strain gages being changed when said drag means is moved by impact of said stream thereon, said strain gages being connected in a bridge circuit for generating an electric signal proportionate to strains induced therein.

DESCRIPTION OF THE DRAWINGS

FIG. 3 is a schematic representation of the bridge circuit employed in the preferred embodiment.

DETAILED DESCRIPTION OF THE PREFERRED EMBODIMENT OF THE INVENTION

Figure 1:
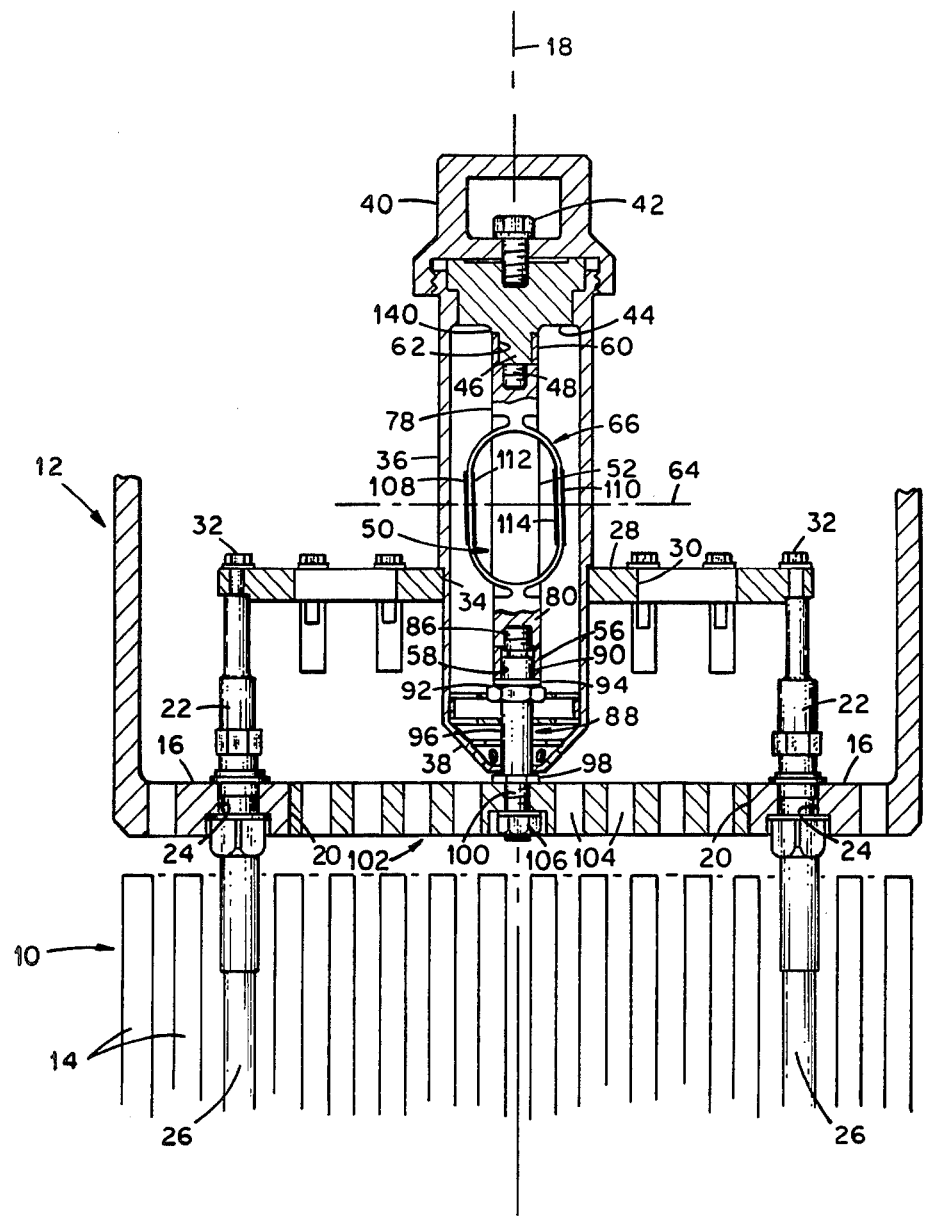
FIG. 1 is a cross-sectional view of the preferred embodiment of the invention as it appears when used to measure the flow of coolant in the core of a nuclear reactor, certain components of said embodiment being omitted from this drawing for clarity.

In FIG. 1, reference numbers 10, 12 generally designate, respectively, a nuclear reactor core and an end box disposed a short distance above the upper ends of fuel rods 14 of the core. A flange 16 extends around the lower end of end box 12 and projects horizontally toward the longitudinal axis 18 of the end box, the edge 20 of this flange defining a large opening through which coolant flows after passing through core 10. The longitudinal axis of the coolant stream coincides with the longitudinal axis 18 of end box 12. Support posts 22 are respectively fixed in holes 24 in flange 16 and project upwardly therefrom with their longitudinal axes parallel with axis 18, the lower ends of these posts being respectively connected to control rods 26 in core 10. A support plate 28 having a plurality of flow apertures 30 extending therethrough rests on the upper ends of support posts 22 and is secured thereto by bolts 32. Support plate 28 is also provided with a centrally located aperture 34 in which a tubular housing 36 is fixedly held in coaxial relation with end box 12 and the large opening at the lower end thereof. Housing 36 is open at its frustoconical lower end 38 but is closed at its upper end by an end cap 40. A bolt 42 extends through an aperture centrally located in end cap 40 and into a hole in a support disk 44, thereby attaching the support disk to the end cap in coaxial relation with housing 36. A pin 46 is integrally formed on support disk 44 and projects downwardly therefrom in coaxial relation with housing 36, the lower end 48 of this pin being threaded and having a reduced diameter.

Figure 2:
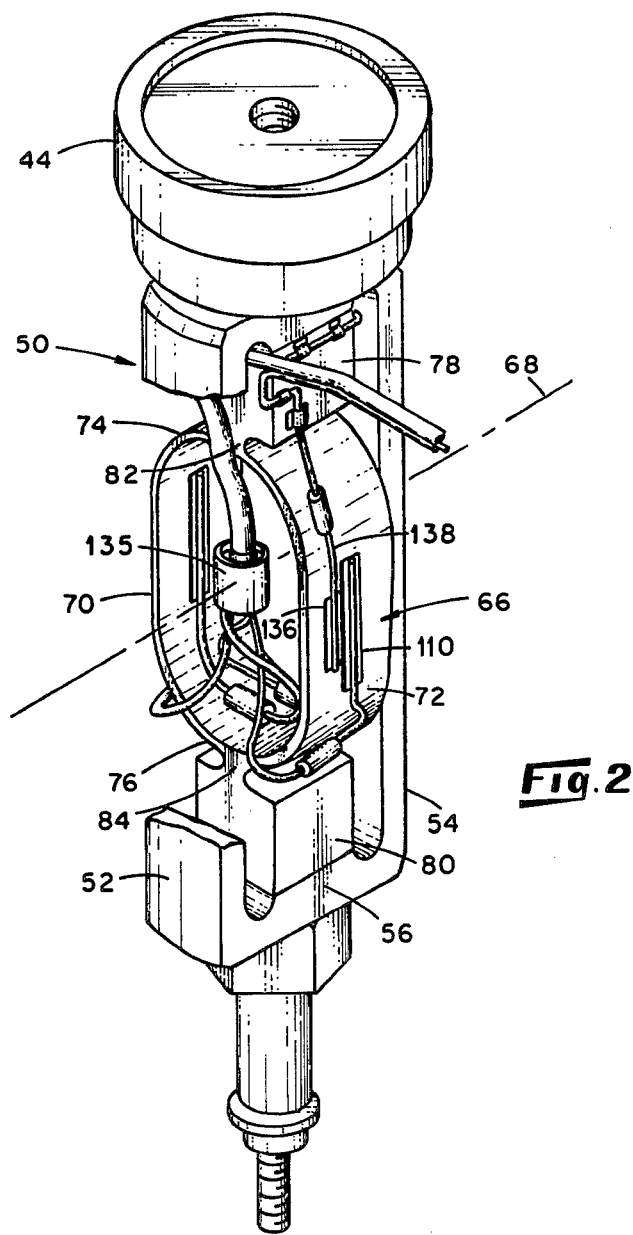
FIG. 2 is a pictorial view of some of the components of the preferred embodiment, including certain components not illustrated in FIG. 1 and with part of one support loop broken away so that other components can be seen.

In FIG. 2, reference number 50 generally designates a rigid ring having elongate sides 52, 54, a lower crossbar 56 having an aperture 58 centrally located therein (see FIG. 1), and an upper crossbar 60 having an aperture 62 centrally located therein. The upper, larger diameter portion of pin 46 on support disk 44 slidably fits in aperture 62, and for a reason that will be explained hereinafter, the length of said upper portion of the pin is 10 mils longer than the vertical width of upper crossbar 60. The central axis 64 (illustrated only in FIG. 1) of ring 50 intersects axis 18 and is perpendicular thereto.

Positioned inside ring 50 and generally designated in FIGS. 1 and 2 by reference number 66 is an obround support loop the central axis 68 of which intersects axis 18 and is perpendicular to both said axis 18 and the central axis 64 of ring 50. The sides 70, 72 of support loop 66 consist of flexible strips which are flat and parallel with axis 18 until they are flexed by forces applied thereto during the use of the apparatus, as will be further described hereinafter. The upper and lower ends 74, 76 of support loop 66 are semicircular in shape and mounting blocks 78, 80 are respectively joined thereto by connecting walls 82, 84. As can be seen in FIG. 1, the threaded lower end 48 of pin 46 is engaged in a hole in mounting block 78, thereby fixing the upper end of support loop 66 in position. It can also be seen in FIG. 1 that the upper end 86 of a support post, generally designated by reference number 88, is engaged in a hole in mounting block 80 and that an adjacent portion 90 of this support post extends through aperture 58 in crossbar 56 of ring 50. A shoulder 92 having a hexagonal cross-sectional shape is formed on support post 88 below crossbar 56, and a washer 94 is positioned on the support post between said shoulder and the crossbar. The middle portion 96 of support post 88 extends through the opening in the lower end 38 of housing 36 and terminates at a second shoulder 98 which also has a hexagonal cross-sectional shape. A clearance of at least 10 mils is provided between the top surface of shoulder 98 and the lower end of housing 36 under no-flow conditions to permit limited upward movement of support post 88 under flow conditions. The lower end 100 of the support post passes through an aperture centrally located in a disk-shaped drag means generally designated by reference number 102 and formed with a plurality of flow apertures 104. Drag means 102 is secured to support post 88 by a nut 106 and it extends across the opening in the lower end of end box 12, the diameter of the drag means being slightly smaller than the diameter of said opening.

Four identical strain gages are attached to support loop 66, namely, a first pair of strain gages 108, 110 respectively attached to the outer surfaces of sides 70, 72 of said support loop and a second pair of strain gages 112, 114 respectively attached to the inner surface of said sides, the directional axes of said gages being parallel with axis 18. As illustrated in FIG. 3, the resistance elements 120–126 of strain gages 108–114 are connected in a bridge circuit the junctures 128–134 of which are disposed in a capsule 135 centrally located within support loop 66. For a reason that will be explained hereinafter, a thermocouple 136 is mounted on side 72 of support loop 66 adjacent strain gage, and a lead 138 extends from this thermocouple to electric circuitry located outside end box 12.

A balance control circuit composed of a variable resistor 142 and a fixed resistor 144 is connected in parallel with one-half of the bridge circuit to obtain electrical zero of the transducer output under no load conditions. To minimize temperature effects the thermal output of the strain gages should be matched to the specific material to which they are mounted. Since the change in resistance of nichrome strain gages, as a function of temperature, can be altered by heat treatment, the strain gages are subjected to a heat treatment to give an output with temperature very nearly equal, but opposite in sign, to the strain imposed by differential thermal expansion when the gage is mounted on the support loop.

OPERATION OF THE PREFERRED EMBODIMENT OF THE INVENTION

A variable flow of coolant upwardly through core 10 and the apertures in drag means 102 obviously exerts a variable force on the drag means and its support post 88. When the sides 70, 72 of support loop 66 are unflexed the upper surface of crossbar 60 of ring 50 is spaced from a shoulder 140 formed on support disk 44 at the point where pin 46 is joined to said support disk. Hence, ring 50 and the lower end 76 of support loop 66 can be moved upward toward support disk 44 until cross-bar 60 contacts shoulder 140, and such movement of the lower end of support loop 66 will bend the thin sides 70, 72 of said support loop and induce strains in the resistance elements 120–126 of strain gages 108–114. Ring 50 thus serves as a means for limiting the amount of flexure which can be placed in sides 70, 72 of support loop 66 (and concomitantly the amount of strain which can occur in strain gages 108–114). The dimensions of sides 70, 72 of support loop 66 are such that the force exerted on drag means 102 by core coolant will usually shift the lower end 76 of said support loop less than 10 mils, which as mentioned hereinbefore, is the difference between the vertical width of crossbar 60 and the length of the upper, larger diameter portion of pin 46.

Equal strains in opposite legs of the bridge (FIG. 3) are additive whereas equal strains in adjacent legs cancel. Therefore, by placing the strain gages 108–114 in the heretofore mentioned positions on the thin sides 70, 72 of support loop 66 and arranging the resistive elements 120–126 of said strain gages as shown in FIG. 3 with outside gages opposite to each other, the following advantages are realized.

1. Strains caused by the draft force of the unidirectional flow in the vertical direction are additive.
2. Strains caused by bending moments from non-symmetric loading and cross-flow are canceled.
3. Resistance changes due to temperature, insofar as they are equal in each leg, are canceled. Equality is achieved by carefully matching thermal resistive characteristics of the strain gages 108–114 to the thermal expansion characteristics of the material of support loop 66.

The heretofore mentioned thermocouple 136 is used to obtain any residual output as a function of temperature, said output being repeatable and linear, in order to remove, as the data is processed, uncertainty due to thermal change during operation. By placing the heretofore mentioned bridge junctures 128–134 in the capsule 74 as close to the strain gages 108–114 as possible and using two extra sense lead wires to excitation junctures 128 and 132, the bridge excitation voltage can be controlled close to the strain gages thereby minimizing effects of resistance changes in the long leads between the junctures 128–134 and the measuring instrumentation.

The disclosed apparatus embodies numerous design features which do not exist in prior art drag body flowmeters. The disclosed apparatus was part of the existing structure as a drag means 102 and transducer housing 36 and hence does not change the pressure drop and flow characteristics. Prior art flowmeters require the drag means to be inserted into the flow stream thereby increasing the pressure drop and distorting the flow pattern. In the disclosed apparatus the strain gage bridge is completed in capsule 74 immediately adjacent the drag means transducer 66. This, together with careful matching of the strain gage 108–114 material and the material of the obround support loop 66, minimizes temperature effects on the output. In prior art flowmeters, the strain gage bridge is completed in a housing exterior to the flowing stream where the temperature environment was more controllable.

Calibration data were obtained over a wide range of temperatures (25°–165° C.) with both a prior art device and the disclosed apparatus in order to determine and compare measurement accuracy, Table I.

|  | Prior Art | Disclosed Apparatus |
|---|---|---|
|  | Single-Phase Flow | |
|  | ±20% | ±10% |
|  | Two-Phase Flow | |
| Low Flow | ±85, −43% | ±25% |
| High Flow | ±35%, −17% | ±14% |

From the table, the disclosed apparatus shows a marked improvement in accuracy over the prior art device in both single and two-phase flows. The tests also showed that the effect of temperature on the zero shift is also greatly reduced in the disclosed apparatus (1% full scale compared to +6% to −20%). The disclosed apparatus has excellent sensitivity, i.e., it can detect changes in force amounting to 0.1% of full scale, and has a high resonant frequency (100 Hz), which means it can follow rapid fluctuations in the magnitude of the force without distortion of the output signal.

What is claimed is:

1. Apparatus for measuring fluid flow in a stream having a variable flow rate comprising:
   an obround support loop having a fixed end and a movable end and first and second sides comprising flexible strips extending between said fixed and movable ends whereby displacement of said movable end relative to said fixed end is accompanied by flexing of said sides, said first and second sides each having inner and outer surfaces;
   movable drag means attached to said movable end of said support loop for causing displacement of said movable end in response to changes in the flow rate of said stream, said drag means being disposed within said stream and responsive to changes in the flow rate thereof; and
   a first pair of strain gages respectively attached to said outer surfaces of said first and second sides and a second pair of strain gages respectively attached to said inner surfaces of said first and second sides, said strain gages being connected in a bridge circuit for generating an electric signal proportionate to strains in said strain gages.

2. The apparatus of claim 1 wherein said drag means comprises a perforate plate extending across said stream.

3. The apparatus of claim 1 wherein said strain gages are matched resistively in pairs and subsequently heat treated to provide a minimum of thermal output when mounted on said support loop.

4. The apparatus of claim 1 wherein the connection of said strain gages in said bridge circuit is made internal to said apparatus for minimizing signal disturbances due to temperature changes in lead wires connected to said bridge circuit, said lead wires including two conductors for providing an output signal and four conductors for sensing voltage and providing constant voltage at said bridge circuit connections.

5. The apparatus of claim 1 including a thermocouple mounted on said support loop.

6. The apparatus of claim 1 further including means limiting displacement of said movable end of said obround support loop.

* * * * *